May 4, 1926.  
H. P. C. GERSTEL  
EMERGENCY BRAKE FOR VEHICLES  
Filed May 9, 1925

1,583,348

Inventor  
H.P.C. Gerstel  
By  
Attorney

Patented May 4, 1926.

1,583,348

UNITED STATES PATENT OFFICE.

HARRY P. C. GERSTEL, OF DETROIT, MICHIGAN.

EMERGENCY BRAKE FOR VEHICLES.

Application filed May 9, 1925. Serial No. 29,100.

*To all whom it may concern:*

Be it known that I, HARRY P. C. GERSTEL, a citizen of Holland, residing at Detroit, in the county of Wayne and State of Michigan, have invented certain new and useful Improvements in Emergency Brakes for Vehicles, of which the following is a specification.

This invention relates to a highly novel means for preventing the wheels of a vehicle from running over a person who has been struck by the vehicle, thereby preventing serious injury to the person.

One of the important objects of the present invention is to provide an emergency brake for vehicles which includes a brake shoe supported on a vehicle at a point forwardly of the wheels thereof, means being provided for normally holding the brake shoe in an inoperative position so as not to interfere with the ordinary operation of the vehicle; means being further provided for facilitating the moving of the brake shoe underneath of the wheels automatically when the vehicle strikes a person or comes in contact with a relatively large obstacle.

A further object is to provide an emergency brake of the above mentioned character, which will at all times be positive and efficient in its operation, the same being further of such construction as to permit the ready installation or attachment thereof on a vehicle without necessitating any material alterations of the latter.

A still further object is to provide an emergency brake of the above mentioned character, which is simple in construction, inexpensive, strong and durable and further well adapted for the purpose for which it is designed.

Other objects and advantages of this invention will become apparent during the course of the following description taken in connection with the accompanying drawing.

Figure 1:
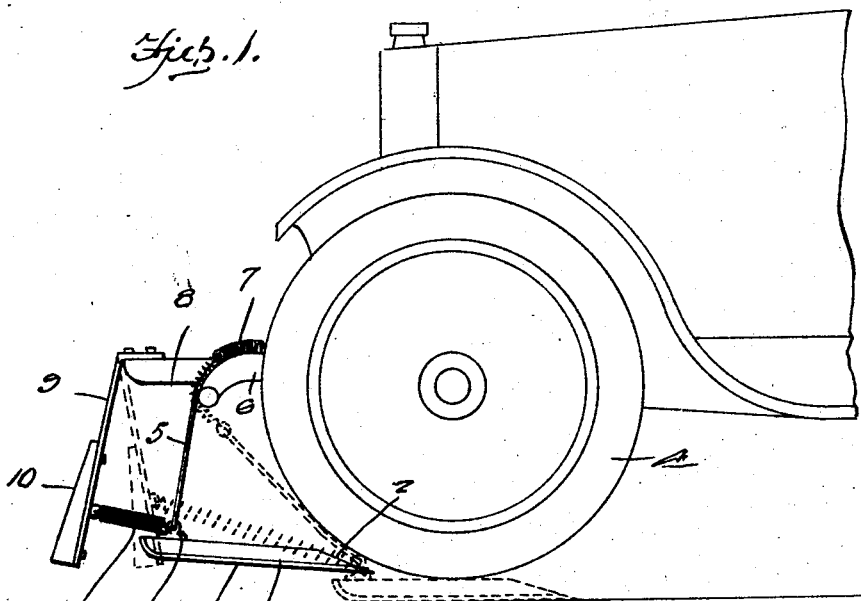
Figure 2:
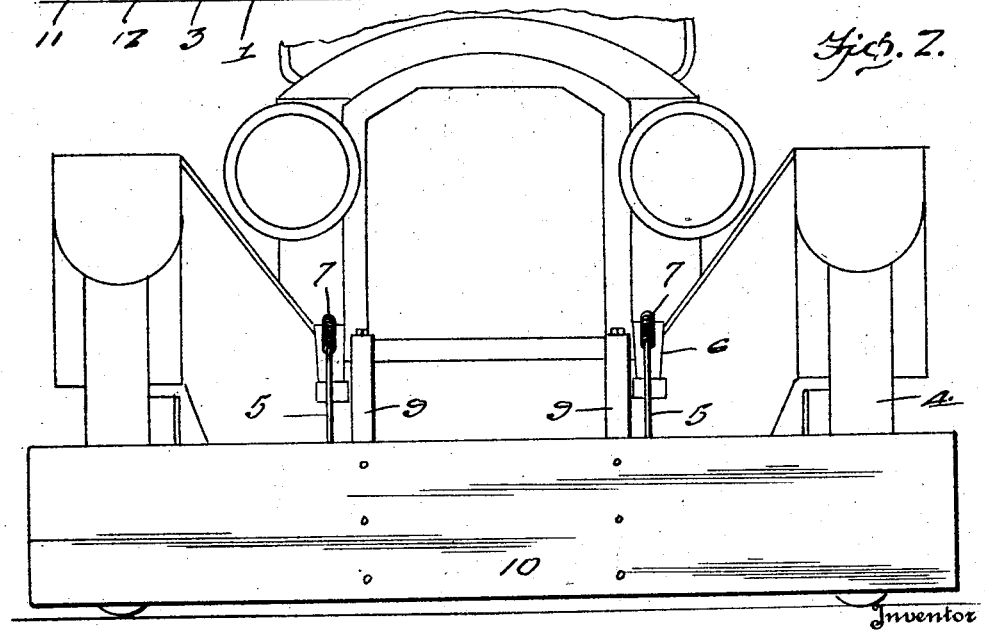

In the accompanying drawing forming a part of this specification, and in which like numerals designate like parts throughout the same:

Figure 1 is a side elevation of the emergency brake embodying my invention, showing the same attached to the front of a motor vehicle, and Figure 2 is a front elevation thereof.

In the drawing, wherein for the purpose of illustration is shown the preferred embodiment of my invention, the numeral 1 designates generally the brake shoe, the same comprising a substantially flat board, the inner longitudinal side edge of which is beveled as illustrated at 2, and the purpose of which will be presently apparent. The bottom of the board is covered with rubber as indicated by the numeral 3.

The brake shoe extends transversely across the front of a motor vehicle forwardly of the front wheels 4. A pair of steel cables 5 are secured at their lower ends to the top of the intermediate portion of the brake shoe, the upper ends of the steel cables extending over the forward ends of the sides of the chassis 6 and being secured to suitable coil springs 7, the latter being secured at their rear ends on the respective sides of the chassis as clearly illustrated in the drawings. The coil springs 7 cooperate with the steel cables 5 in normally holding the brake shoe 1 in an inoperative position.

Extending forwardly from the motor vehicle are a pair of supporting beams or arms 8, the same being arranged adjacent the respective sides of the chassis. Flexible metallic brackets 9 are secured at their upper ends on the forward ends of the respective supporting beams, said brackets being bent over the forward ends of the respective beams. Supported on the lower portions of the brackets is the transversely extending elongated bumper board 10, the same being of such length as to have its ends extending beyond the sides of the vehicle in the manner clearly illustrated in Figure 2.

A pair of coil springs such as is shown at 11 affords a connection between the bumper board 10 and the brake shoe 1, each spring being secured at one end to the rear face of the bumper board 10 at a point adjacent the end thereof, the opposite end of each spring being fastened to the connection 12 provided for the lower end of the respective steel cables 5.

Normally the parts are arranged as shown in Figure 1 of the drawing, whereby both the brake shoe 1 and the bumper board 10 are in a raised position out of engagement with the ground and furthermore the brake shoe is spaced from the vehicle wheels so that the device embodying my invention will not in any way interfere with the usual operation of the vehicle. The use of my improved emergency brake may be briefly stated as follows:

Should a person accidentally come in the path of a moving vehicle having attached thereon my improved emergency brake, immediately upon the person being struck by the bumper board 10 and knocked down, the brake shoe will move rearwardly due to the connection between the bumper board and the brake shoe through the medium of the coil springs 11. The rearward movement of the brake shoe 1 will cause the beveled rear edge 2 of the brake shoe to be wedged between the front wheels 4 of the vehicle and the ground causing the vehicle wheels to move upwardly on the upper face of the brake shoe and the rubber bottom face of the brake shoe will provide a firm footing so that the further movement of the vehicle will be retarded; this will cause the vehicle to come to an immediate stop thereby preventing any possibility of the vehicle wheels from running over the person who has been struck and knocked down.

In order to disengage the brake shoe from engagement with the wheels and ground, it is necessary that the vehicle be moved rearwardly so that the vehicle wheels will move rearwardly off of the brake shoe and as soon as the wheels are out of engagement therewith, the coil springs 7 as well as the coil springs 11 will automatically return the brake shoe 1 and the bumper board 10 respectively to their normal positions so that the vehicle may again be actuated in the usual manner.

If desired, a brake shoe of the class described may also be used in conjunction with the rear wheels of a vehicle, and I do not wish to limit myself to the arrangement of my improved emergency brake on a vehicle. Any suitable means may be provided for cooperation with the brake shoes for the rear wheels whereby the same can be actuated by the driver of the automobile. A brake mechanism of the above character may also be associated with a trailer attached on the back of an automobile.

A device of the above mentioned character may be readily and easily attached, and will at all times be positive and efficient in carrying out the purposes for which it is designed. Furthermore, a device of this character will prevent serious injuries upon the occurrence of an accident. The emergency brake will also work efficiently when obstacles of a large size are encountered.

While I have shown the preferred embodiment of my invention, it is to be understood that various changes in the size, shape and arrangement of parts may be resorted to without departing from the spirit of the invention or the scope of the appended claims.

Having thus described the invention, what I claim is:—

1. An emergency brake for vehicles comprising a transversely extending brake shoe, flexible means for attaching the same to the chassis of the vehicle at a point forwardly of the vehicle wheels, a bumper board disposed forwardly of the brake shoe, flexible means for supporting the same on the vehicle transversely thereof, a coil spring connecting the bumper board and the brake shoe, said brake shoe adapted to be moved rearwardly between the vehicle wheels and the ground to effect the stopping of the vehicle when the bumper board encounters an object, and resilient means associated with the brake shoe supporting means and adapted for cooperation with the aforementioned coil springs for automatically returning the brake shoe and the bumper board respectively to their normal positions when the wheels are disengaged from the brake shoe.

2. An emergency brake for vehicles comprising a transversely extending brake shoe, flexible means for supporting the brake shoe to the chassis of a vehicle at a point forwardly of the vehicle wheels comprising cables secured at their lower ends to the brake shoe, coil springs secured at one end to the upper ends of the respective cables and at their other ends to the respective sides of the chassis, a bumper board disposed forwardly of the brake shoe, flexible means for supporting the same transversely of the vehicle, a resilient connection between the bumper board and the brake shoe, said brake shoe adapted to be moved rearwardly between the vehicle wheels and the ground to effect the stopping of the vehicle when the bumper board encounters an object, the aforementioned coil springs and said resilient connections between the bumper board and the brake shoe being adapted to automatically effect the return of the brake shoe and the bumper board respectively to their normal positions when the wheels are disengaged from the brake shoe.

In testimony whereof I affix my signature.

HARRY P. C. GERSTEL.